No. 632,531. Patented Sept. 5, 1899.
C. F. LEHMANN.
MACHINE FOR CUTTING HELMET BRIMS.
(Application filed Jan. 25, 1899.)
(No Model.) 3 Sheets—Sheet 1.

No. 632,531. Patented Sept. 5, 1899.
C. F. LEHMANN.
MACHINE FOR CUTTING HELMET BRIMS.
(Application filed Jan. 25, 1899.)
(No Model.) 3 Sheets—Sheet 2.
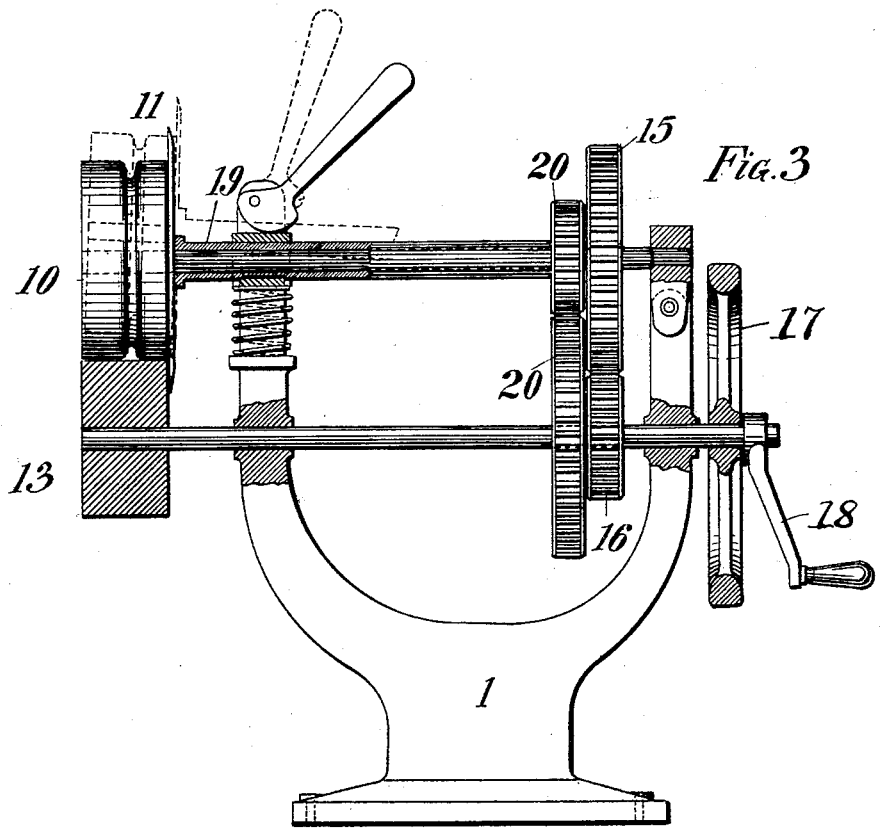
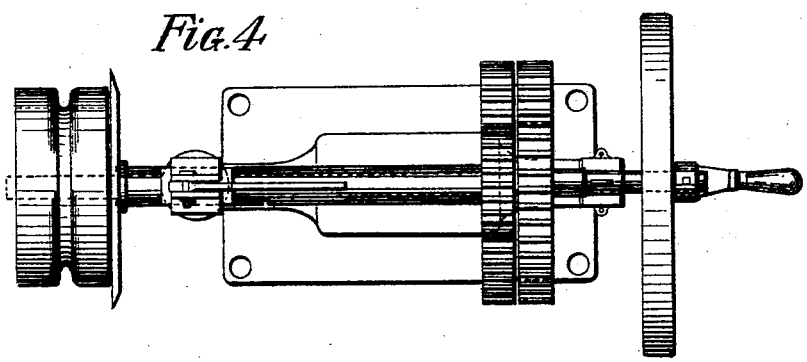
Witnesses
Charles F. Lehmann Inventor
By his Attorney No. 632,531. Patented Sept. 5, 1899.
C. F. LEHMANN.
MACHINE FOR CUTTING HELMET BRIMS.
(Application filed Jan. 25, 1899.)

(No Model.) 3 Sheets—Sheet 3.

Witnesses
Charles F. Lehmann Inventor
By his Attorney

UNITED STATES PATENT OFFICE.

CHARLES F. LEHMANN, OF NEW YORK, N. Y.

MACHINE FOR CUTTING HELMET-BRIMS.

SPECIFICATION forming part of Letters Patent No. 632,531, dated September 5, 1899.

Application filed January 25, 1899. Serial No. 703,398. (No model.)

*To all whom it may concern:*

Be it known that I, CHARLES F. LEHMANN, a citizen of the United States, residing at New York city, in the county of Kings and State of New York, have invented certain new and useful Improvements in Machines for Cutting Helmet-Brims, of which the following is a full, clear, and exact description.

This invention relates to machines for cutting helmet-brims; and its object is to construct a machine which shall be capable of efficiently cutting in a uniform manner the outer edges of helmet-brims or other articles wherein it is desirable to trim edges or cut irregular lines.

Heretofore in the making of helmets it has been customary to form the crown and brim portions and after blocking the same into shape with an unfinished and irregular edge to trim or cut the edge of the brim by hand to the desired outline, the operator customarily using a pair of scissors for the cutting or trimming purpose. In consequence of the fact that the brim is of an irregular shape, varying both in width and in its angle of pitch to the crown, the resulting curve or line which the operator must follow in cutting is neither regular nor uniform in its distance from the crown. It therefore requires expert skill of the highest order for the work of cutting the brims. According to my invention I propose to do by machinery this work which heretofore has been done by hand, and in carrying out the invention I make use of a cutting-machine and a device for directing the line of the cut made by the machine.

The invention possesses various features of advantage which will be more particularly referred to hereinafter.

In the accompanying drawings I have illustrated machines designed for carrying my invention into effect, it being understood that other forms may be used instead of those here shown.

Figure 1:
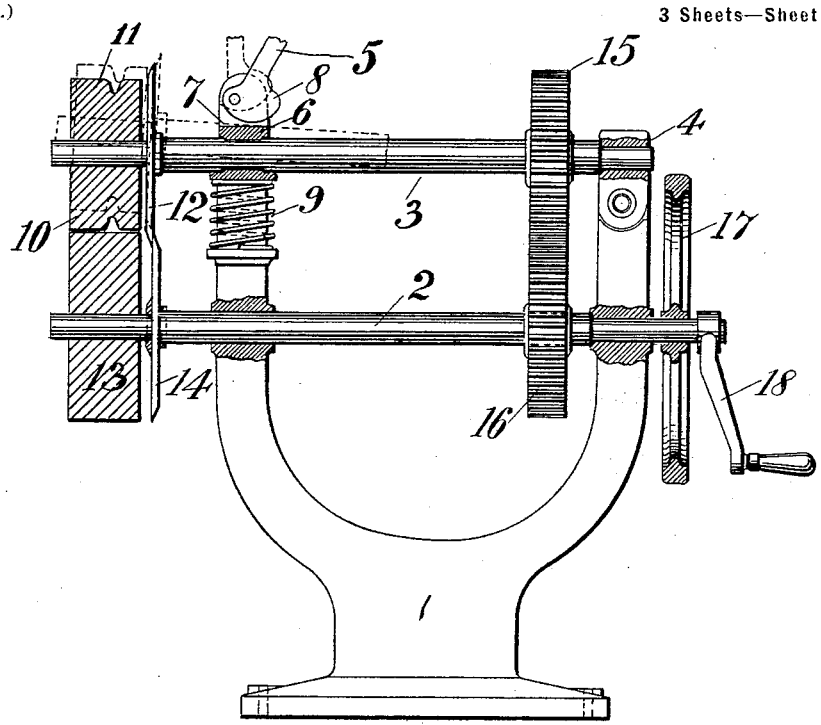
Figure 2:
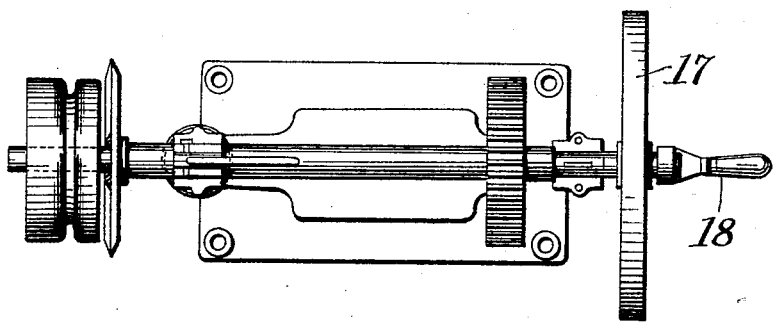
Figure 5:
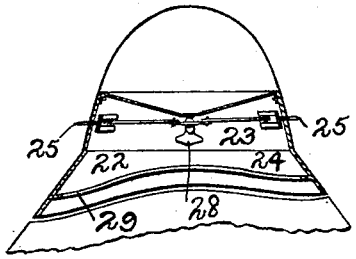
Figure 6:
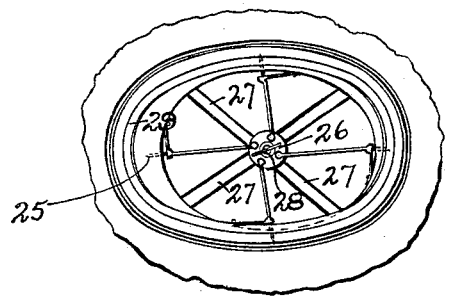
Figure 7:
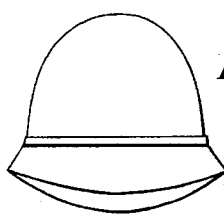
Figure 8:
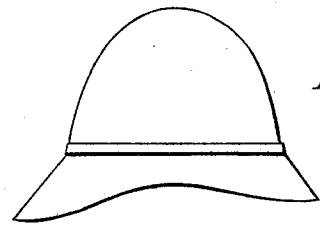

In the drawings, Figure 1 is a side view, partly in section, of a cutting-machine constructed in accordance with my invention. Fig. 2 is a plan view of Fig. 1. Fig. 3 is a side view, partly in section, of a modified form of cutting-machine. Fig. 4 is a plan view of Fig. 3. Fig. 5 is a sectional elevation of a helmet, showing the guide-rim therein. Fig. 6 is a plan view of the under side of Fig. 5; and Figs. 7 and 8 are respectively end and side views of a helmet, illustrating the irregularity in the shape of the rim.

Referring more particularly to the drawings, in which like figures denote like parts in all of the several figures, 1 represents a suitable base, upon which the cutting-machine is mounted, the base having bearings for a shaft 2 and a shaft 3 therein. The bearings of the shaft 2 should be fixed in the base; but the bearing 4 of shaft 3 is suitably pivoted to the base to allow the shaft and its other bearing 6 to be swung vertically, the bearing 6 being adapted to slide vertically in a slot 7 cut in the base.

5 represents a lever mounted in the frame and having a cam 8, adapted to bear upon the upper surface of the bearing 6 and hold the same in its lowermost and normal position when in the position shown in full lines in the drawings. Below the bearing 6 is a spring 9, which is carried by the base and acts to force the bearing 6 upward. A roll 10, having an annular groove 11 cut in its periphery, is mounted upon the outer end of shaft 3, and immediately inside the roll 10 a circular knife 12 is also mounted upon the shaft 3. Immediately below the roll 10 a similar roll 13, having a flat peripheral surface, is mounted upon the end of shaft 2, and a circular knife 14 is mounted upon shaft 2 in such position that its edge will almost touch and slightly overlap the edge of the knife 12. Upon shaft 3 is mounted a gear-wheel 15, which meshes with a similar gear-wheel 16, mounted upon the shaft 2. A balance-wheel 17 and a crank 18 are fixed to the end of the shaft 2. The rolls 10 and 13 are separated to such an extent that a helmet-brim may be passed between them, the rolls gripping the brim and helping to hold it in position as it passes through.

In Figs. 3 and 4 is shown a modified form of cutting device in which but one cutting-knife is employed, the knife 12 being mounted upon a sleeve 19, which loosely surrounds the shaft 3 and rests in the bearing 6. At the end of the sleeve is a gear-wheel 20, which meshes with a larger gear-wheel 21 upon the shaft 2. In this instance the gears 15 and 16 are mounted upon the shafts 3 and 2, as heretofore described, and operate the rolls in the same manner. The gear 20, however, being smaller than the gear-wheel 21, the knife 12 will rotate at greater speed than the roll 10. In other respects the machine is substantially the same as that shown in Figs. 1 and 2. The size of the various rolls and the relative size and speed of the various gear-wheels are a matter which will be governed by individual conditions and will vary in different machines to suit the various uses to which the machine is to be put.

In order to guide the rim of the helmet in passing through the cutting-machine, so that the line of the cut will be the line of the desired edge of the helmet, I provide a guide rim or templet 22, which comprises an elliptical rim of substantially the same size as the interior of the helmet to be cut and having a vertical portion 23, adapted to fit into the crown of the helmet, and a brim portion 24, adapted to rest against the under side of the brim. The rim is preferably made of light flexible material, and in its vertical portion is provided with a number of fastening-points 25 25 25, &c., pivotally connected at one end to a plate 26, which is mounted upon the cross-braces 27 27 of the templet 22, the plate behind pivoted on said brace and adapted to be turned thereon by a handle 28. The point 25 projects from the plate 26 through the openings of the rim when the plate is turned.

A track 29 of substantially the same cross-section as the groove 11, but slightly smaller than the groove, is carried by the under side of the brim portion of the guide-rim and projects downward from the brim portion substantially perpendicular thereto. The track 29 extends entirely around the brim portion of the hat in a line parallel to the edge of the brim. In the various styles of helmets using differently-shaped brims the line of this track will of course vary, but it will always be parallel to the edge of the desired brim. It will be understood, of course, that in place of the track a groove may be employed, or, in fact, any other suitable guide, the term "track" being intended herein to include all suitable forms of guides.

In the operation of the device above described the helmet is made up in the usual manner with the edge of its brim untrimmed and unfinished. The guide-rim is then inserted in the helmet and pushed in until its sides and brim portion snugly fit against the interior of the helmet, the plate 26 being turned to draw the points 25 inside the rim. The plate 26 is then turned to force the fastening-points 25 25 25 25 out through the rim and the sides of the helmet, and thus securely hold the guide-rim in position. The helmet is then inverted and carried to the cutting-machine and the lever 5 of the latter pushed to the position shown in dotted lines in Figs. 1 and 3, which allows the spring 9 to force the bearing 6 upward, the shaft 3 swinging in its bearing 4, and thus separating the rolls 10 and 13 sufficiently to allow the brim of the helmet in its inverted position and carrying the templet to be inserted between the rolls, the track 29 fitting into the groove 11. The lever 5 is then thrown over to the position shown in full lines in the drawings, which causes the cam 8 to force the bearing 6 downward to its normal position, the gears 15 and 16, which may have been separated when the shaft 3 swung upward, again meshing with each other. The crank 18 is then turned, causing the rolls and the knives to rotate, the brim of the helmet being drawn between the rolls and the edge cut off as the brim passes through. When the edge has been cut all the way around the brim of the helmet, the lever 5 is swung upward, allowing the shafts to separate and the helmet and the guide-rim to be taken out. The rim is then attached to the next helmet to be cut and inserted and operated, as before described.

It is obvious that various styles of rims may be employed, and the shape of the brim to be produced may be varied at will by simply changing the line of the track 29.

Instead of the forms of cutting-machines herein shown and described any suitable device for accomplishing the purpose may be employed, although in the application of the invention to the cutting of cork helmet-brims it will be found that the rotary cutters are preferable, if not absolutely necessary. If preferred, the rolls may be inverted or the groove placed in the lower roll or other means for controlling the position of the guide employed or the various parts of the machines herein described interchanged or dispensed with without departing from the spirit or scope of the invention, it being here noted that I do not intend to confine myself to the precise construction and operation herein shown and illustrated in the drawings.

Although I have described the invention herein as having particular reference to the cutting of helmet-brims, I desire it to be understood that I claim all the uses to which the invention may be put.

Having thus described my invention, I declare that what I claim as new, and desire to secure by Letters Patent of the United States, is—

1. The combination of a guide adapted to be fixed to the article to be cut, said guide being parallel to the line of the desired cut, a cutting device in fixed position, and means for keeping the guide a fixed distance from the cutting device, substantially as described.

2. The combination of a guide adapted to be fixed to the article to be cut, said guide being parallel to the line of the desired cut, a rotary cutting device in fixed position, and means for keeping said guide a fixed distance from the cutting device, substantially as described.

3. The combination of a guide adapted to be fixed to the article to be cut, a cutting device, means for controlling the position of said guide with respect to the cutting device, and means for maintaining a fixed constant distance between said cutting device and said first-named means, substantially as described.

4. The combination of a guide-rim adapted to be fixed to the article to be cut, and having a track parallel to the line of the desired cut, a cutting device in fixed position, and a feeding device comprising a roll mounted adjacent to said cutting device, said roll having an annular groove adapted to receive said track, substantially as described.

5. The combination of a guide-rim adapted to be fixed to the article to be cut, and having a track parallel to the line of the desired cut, two rolls between which said article and guide are adapted to pass, means for operating said rolls, a cutting device, and means for operating said cutting device, one of said rolls having an annular groove adapted to receive said track and keep the same a fixed distance from said cutting device, substantially as described.

6. The combination of a guide-rim adapted to be fixed to the article to be cut, and having a track parallel to the line of the desired cut, a cutting device, means for operating said device, two rolls between which said guide is adapted to pass, one of said rolls having an annular groove adapted to receive said track and keep the same a fixed distance from said cutting device, means for operating said rolls, and means whereby said rolls may be separated from each other, substantially as described.

7. The combination of a guide adapted to be fixed to the article to be cut, said guide being parallel to the line of the desired cut, a cutting device, means for operating said cutting device, two rolls between which said guide is adapted to pass, one of said rolls being provided with means for controlling the position of said guide with respect to the cutting device, and means for operating said rolls, substantially as described.

8. The combination of a guide adapted to be fixed to the article to be cut, said guide being parallel to the line of the desired cut, a cutting device mounted upon a rotary shaft, means for operating said cutting device, and a feeding device comprising a roll mounted concentrically to said shaft, said roll being provided with means for receiving said track and holding the same a fixed distance from said cutting device, and means for operating said roll, substantially as described.

9. The combination of a guide-rim adapted to be fixed to the article to be cut, and having a track parallel to the line of the desired cut, a rotary cutting device, means for operating said cutting device, a feeding device comprising a roll mounted concentrically with said cutting device, an annular groove in said roll adapted to receive said track and keep the same a fixed distance from said cutting device, and means for operating said roll, substantially as described.

10. The combination of a guide-rim adapted to be fixed to the article to be cut and having a track parallel to the line of the desired cut, a rotary cutting device, means for operating said cutting device, two rolls between which said guide is adapted to pass, one of said rolls having an annular groove adapted to receive the said track and keep the same a fixed distance from said cutting device, and means for operating said rolls, substantially as described.

11. The combination of a guide-rim adapted to be fixed to the article to be cut and having a track parallel to the line of the desired cut, a cutting device having a rotating cutter, means for operating said cutting device, two rolls between which said guide-rim is adapted to pass, one of said rolls being concentric with said rotating cutter and having an annular groove adapted to receive the said track and keep the same a fixed distance from said cutting device, and means for operating said rolls, substantially as described.

12. The combination of a guide-rim adapted to be fixed to the article to be cut, and having a track parallel to the line of the desired cut, a cutting device having a rotating cutter, means for operating said cutting device, two rolls between which said guide is adapted to pass, one of said rolls being concentric with said rotating cutter and having an annular groove adapted to receive the said track and keep the same a fixed distance from said cutting device, and means for separating said rolls, substantially as described.

13. The combination of a guide-rim adapted to be fixed to the article to be cut, and having a track parallel to the line of the desired cut, two parallel rotary shafts, two oppositely-disposed rolls, one mounted on each shaft, means for operating said rolls, a cutting device at the side of said rolls, means for operating said cutting device, and an annular groove in one of said rolls adapted to receive said track, substantially as described.

14. The combination of a guide-rim adapted to be fixed to the article to be cut, and having a track parallel to the line of the desired cut, two parallel rotary shafts, two oppositely-disposed rolls, one mounted on each shaft, means for operating said rolls, a cutting device at the side of said rolls, means for operating said cutting device, an annular groove in one of said rolls adapted to receive said track, and means whereby said shafts may be swung apart at the ends upon which the rolls are mounted, substantially as described.

15. A guide for helmet-cutting machines, comprising a part adapted to be inserted in the crown of the helmet, means for fastening the same therein, and a track carried thereon, said track being parallel to the line of the desired cut, substantially as described.

16. A guide for cutting the rims of helmets, comprising a part adapted to be inserted in the crown of the helmet, a rotary plate mounted upon said part, and a plurality of projections pivoted to the periphery of said plate and adapted to be projected through the helmet by the rotation of said plate, and a track carried by said guide, said track being parallel to the line of the desired cut, substantially as described.

17. The combination of a guide adapted to be fixed to the article to be cut, said guide being parallel to the line of the desired cut, two rotary shafts, a cutter-wheel mounted upon each of said shafts, the cutting edges of each of said wheels being adjacent to each other, a feeding device adapted to engage said guide, and means for maintaining a fixed constant distance between said cutting device and said feeding device, substantially as described.

18. The combination of a guide adapted to be fixed to the article to be cut, said guide being parallel to the line of the desired cut, two rotary shafts, a cutter-wheel mounted upon each of said shafts, the cutting edges of each of said wheels being adjacent to and overlapping each other, said wheels being adapted to rotate in fixed position, and means for keeping the said guide a fixed distance from said cutting-wheels, substantially as described.

In testimony whereof I affix my signature in presence of two witnesses.

CHARLES F. LEHMANN.

Witnesses:
C. V. EDWARDS,
GEO. W. HESS.